(12) United States Patent
Cho

(10) Patent No.: US 8,257,456 B2
(45) Date of Patent: Sep. 4, 2012

(54) VACUUM SYSTEM USING A FILTER CARTRIDGE

(75) Inventor: Ho-Young Cho, Seoul (KR)

(73) Assignee: Korea Pneumatic System Co., Ltd., Seoul (KR)

( * ) Notice: Subject to any disclaimer, the term of this patent is extended or adjusted under 35 U.S.C. 154(b) by 339 days.

(21) Appl. No.: 12/450,139

(22) PCT Filed: Jan. 29, 2008

(86) PCT No.: PCT/KR2008/000531
§ 371 (c)(1),
(2), (4) Date: Sep. 11, 2009

(87) PCT Pub. No.: WO2008/111730
PCT Pub. Date: Sep. 18, 2008

(65) Prior Publication Data
US 2010/0031824 A1    Feb. 11, 2010

(30) Foreign Application Priority Data
Mar. 15, 2007    (KR) .................. 10-2007-0025373

(51) Int. Cl.
*B01D 46/00*    (2006.01)
(52) U.S. Cl. ............... 55/302; 55/410; 55/418; 55/468; 55/498; 55/504
(58) Field of Classification Search .............. 55/350.1, 55/385.3, 392, 413, 431, 432, 468, 484, 508; 96/416; 123/198 E
See application file for complete search history.

(56) References Cited

U.S. PATENT DOCUMENTS

| 3,265,293 A | 8/1966 | Schibbye |
| 3,618,772 A | 11/1971 | Dietrick |
| 3,765,247 A | 10/1973 | Riggs |
| 4,395,202 A | 7/1983 | Tell |

(Continued)

FOREIGN PATENT DOCUMENTS
JP    63-185737    8/1988
(Continued)

OTHER PUBLICATIONS
PCT Inter'l Search Report, Apr. 2007.
(Continued)

*Primary Examiner* — Duane Smith
*Assistant Examiner* — Karla Hawkins
(74) *Attorney, Agent, or Firm* — Larkin Hoffman Daly & Lindgren Ltd.; Robert C. Klinger

(57) ABSTRACT

Disclosed is a vacuum system capable of realizing a simple, compact configuration using a filter cartridge. The vacuum system makes use of a container-shaped filter cartridge, which includes an intake port, an inflow port for compressed air, and a mounting port in a sidewall thereof, and a filter which is disposed in a space therein covered by a cap and filters air flowing in through the intake port. An ejector pump passes through the mounting port of the filter cartridge, is installed such that one end thereof is adjacent to or inserted into the inflow port, and includes a through-hole formed in a nozzle body so as to communicate with the space inside the filter cartridge. In the state in which the ejector pump is mounted, the filter cartridge is used as a housing providing a vacuum chamber or an enclosed space.

3 Claims, 5 Drawing Sheets

U.S. PATENT DOCUMENTS

| | | | |
|---|---|---|---|
| 4,466,778 A | 8/1984 | Volkmann | |
| 4,597,716 A | 7/1986 | Evenson | |
| 4,861,232 A | 8/1989 | Ise et al. | |
| 4,877,377 A | 10/1989 | Taylor | |
| 4,880,358 A | 11/1989 | Lasto | |
| 5,032,260 A | 7/1991 | Alzner | |
| 5,205,717 A | 4/1993 | Tell | |
| 5,228,839 A | 7/1993 | Peterson et al. | |
| 5,505,753 A * | 4/1996 | Heysek | 96/416 |
| 5,623,870 A | 4/1997 | Daniel | |
| 5,624,239 A | 4/1997 | Osika | |
| 5,951,266 A | 9/1999 | Maruyama et al. | |
| 6,004,109 A | 12/1999 | Gebele et al. | |
| 6,155,796 A | 12/2000 | Schmalz et al. | |
| 6,158,573 A | 12/2000 | Janzen | |
| 6,171,068 B1 * | 1/2001 | Greenberg | 417/174 |
| 6,394,760 B1 | 5/2002 | Tell | |
| 6,464,262 B1 | 10/2002 | Tell | |
| 6,561,769 B1 | 5/2003 | Tell | |
| 6,588,580 B2 | 7/2003 | Janzen | |
| 6,682,313 B1 | 1/2004 | Sulmone | |
| 6,764,526 B2 * | 7/2004 | Freytag et al. | 55/385.3 |
| 7,909,903 B2 * | 3/2011 | Cho | 55/392 |

FOREIGN PATENT DOCUMENTS

| | | |
|---|---|---|
| JP | 9-309618 | 12/1997 |

OTHER PUBLICATIONS

PCT Written Opinion, May 15, 2008.

Inter'lPreliminary Report, Jan. 2009.

* cited by examiner

[Figure 1]
(PRIOR ART)
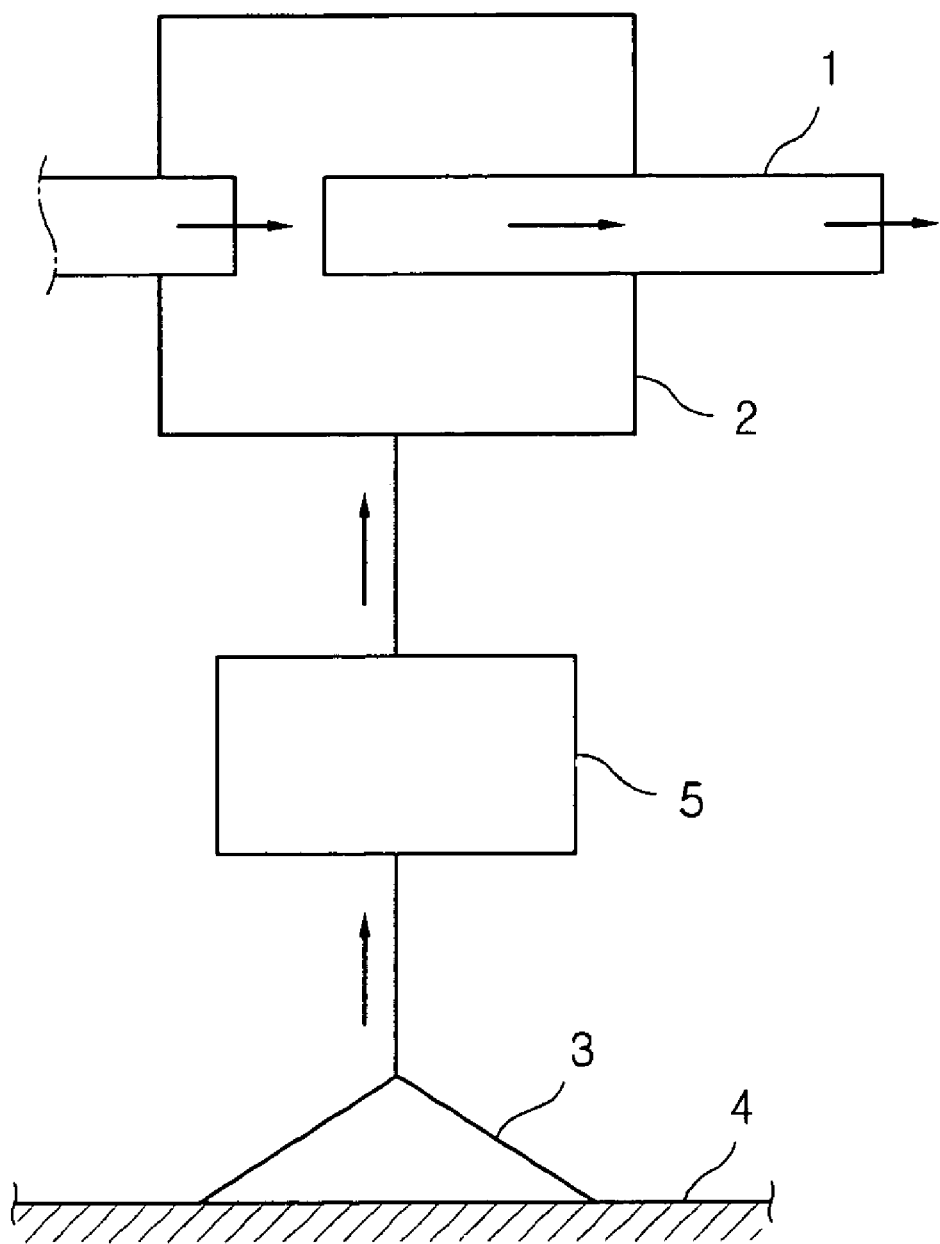

【Figure 2】
(PRIOR ART)
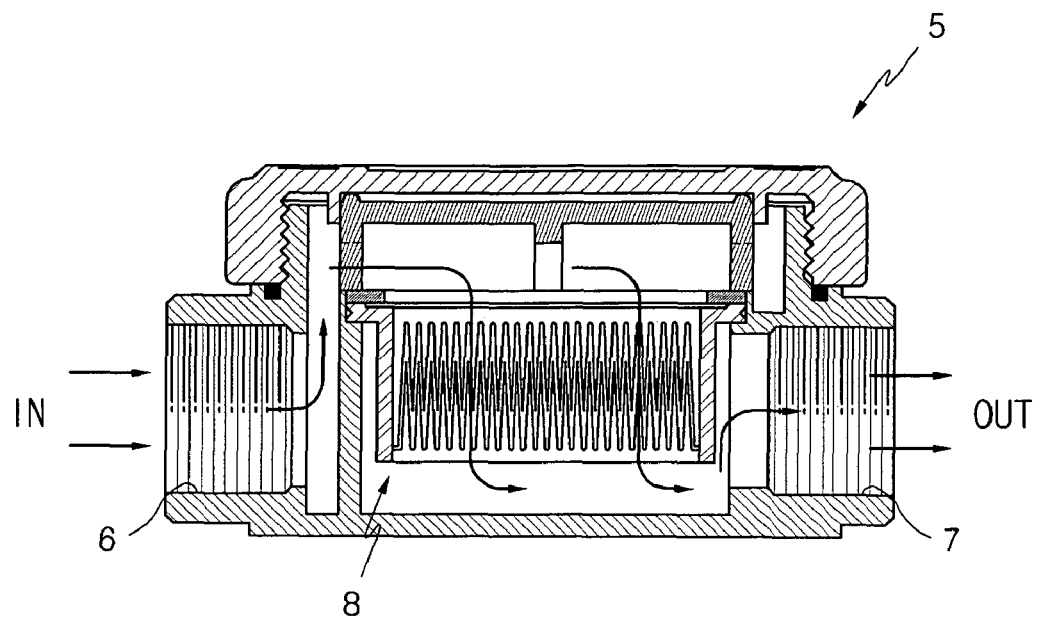

[Figure 3]
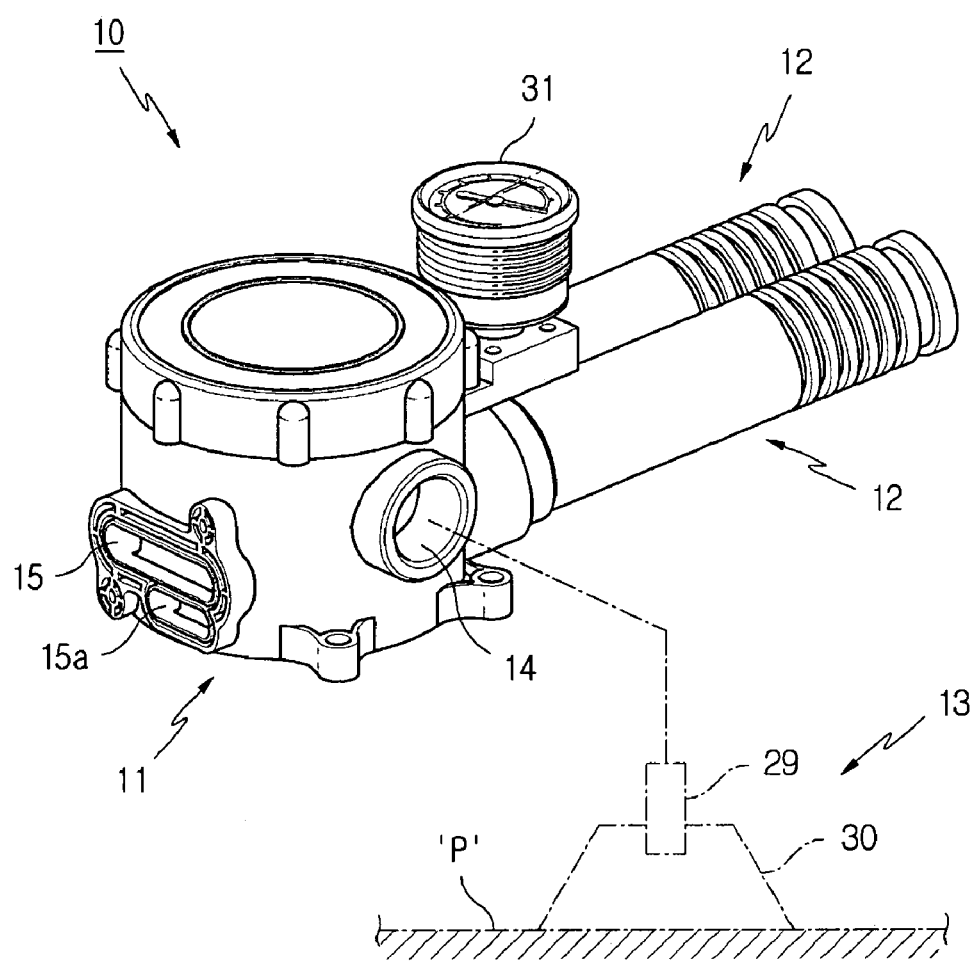

[Figure 4]
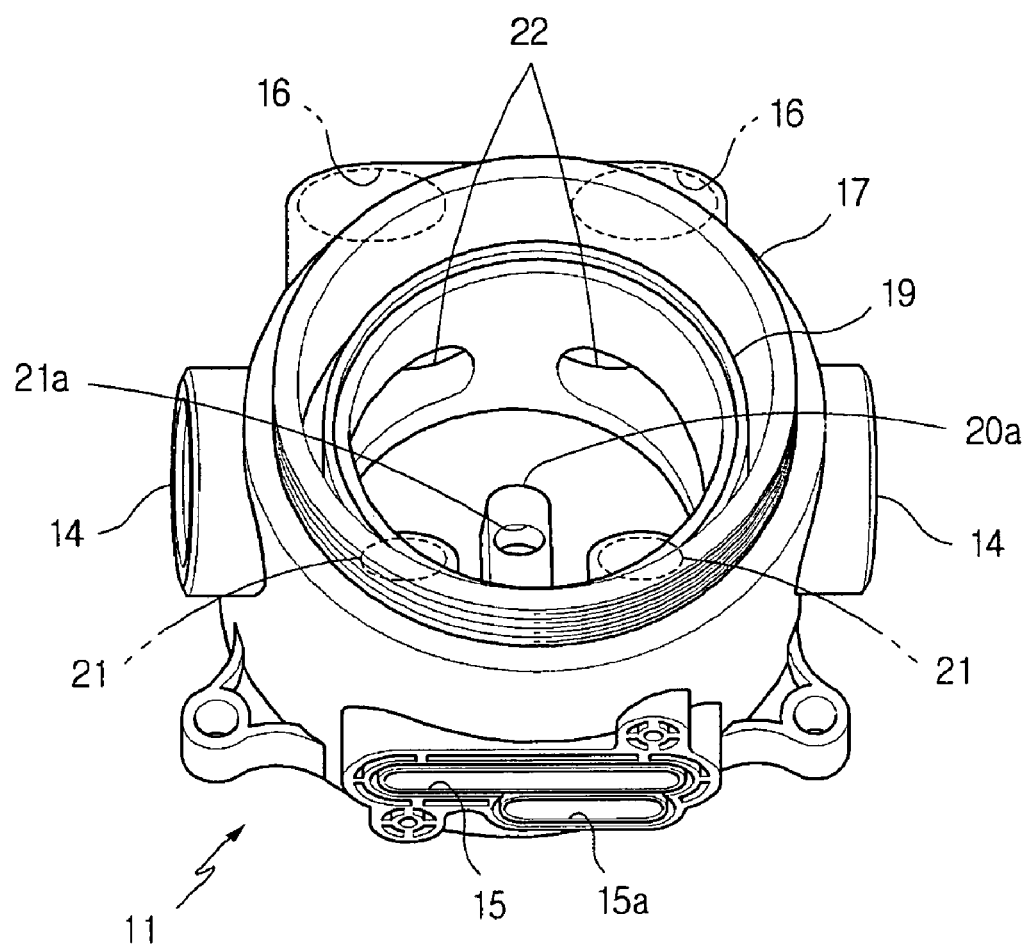

[Figure 5]
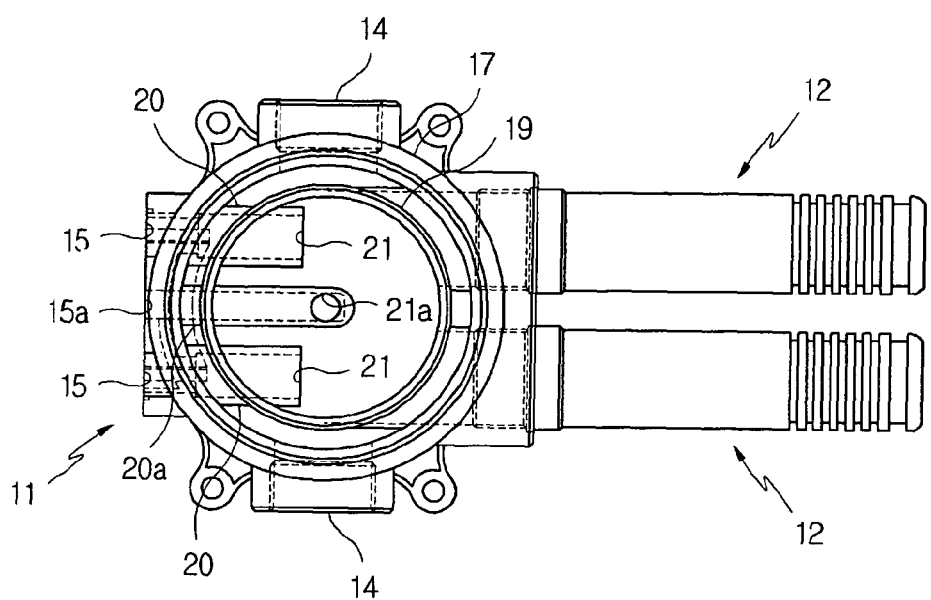
[Figure 6]
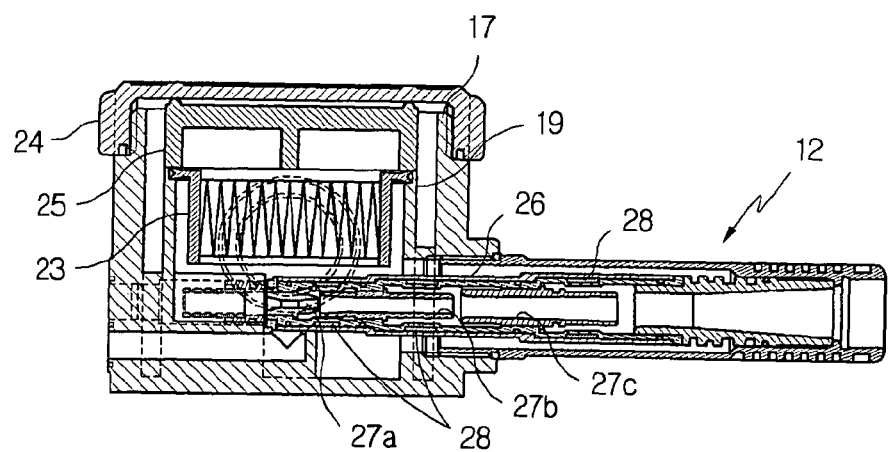

VACUUM SYSTEM USING A FILTER CARTRIDGE

TECHNICAL FIELD

The present invention relates to a vacuum system and, more particularly, to a vacuum system, which is connected as required with apparatuses using a filter cartridge.

BACKGROUND ART

Referring to FIG. 1, a vacuum system is generally equipped with an ejector 1 excavating an enclosed space using compressed air flowing therethrough at a high speed, a housing 2 defining the enclosed space, and an adsorption pad 3 communicating with the housing 2. When the compressed air flows through the ejector 1 at high speed, air in the pad 3 is drawn toward the enclosed space, which is in a vacuum state, and is discharged outside along with the compressed air. At this time, a vacuum is formed in the enclosed space, and negative pressure is created in the adsorption pad 3. A workpiece 4 can be transferred by this negative pressure. In this vacuum system, an air filter cartridge 5 is installed between the housing 2 and the adsorption pad 3, and prevents dust, foreign materials, etc. on the workpiece 4 from entering the ejector 1.

FIG. 2 illustrates a known filter cartridge 5 used in the vacuum system. The filter cartridge 5 includes an inlet 6 oriented to the adsorption pad 3, an outlet 7 oriented to the ejector 1, and a filter 8 disposed therein. The filter cartridge 5 is disposed on an intake line between the adsorption pad 3 and the ejector 1, and is designed so that foul air flowing in through the inlet 6 is filtered through the filter 8, and then flows out through the outlet 7 (see arrows). Of course, the filter cartridge 5 plays a useful role of filtering the foul air in the vacuum system.

However, since the filter cartridge 5 is additionally mounted on the intake line of the vacuum system, the use of the filter cartridge 5 does not meet the general demand for a more simple and compact vacuum system. Moreover, the intake line of the vacuum system is long, so that the vacuum response speed to the compressed air is decreased, and vacuum loss is increased.

DISCLOSURE

Technical Problem

Accordingly, the present invention has been made in an effort to solve the problems occurring in the related art, and an object of the present invention is to provide a vacuum system, which has a simple, compact configuration using a filter cartridge, so that the characteristics thereof are improved.

Technical Solution

In order to achieve the above object, according to one aspect of the present invention, there is provided a vacuum system, which comprises: a container-shaped filter cartridge, which includes an intake port, an inflow port for compressed air, and a mounting port in a sidewall thereof, and a filter which is disposed in a space therein covered by a cap and filters air flowing in through the intake port; an ejector pump, which passes through the mounting port of the filter cartridge, is installed such that one end thereof is adjacent to or inserted into the inflow port, and includes a through-hole formed in a nozzle body so as to communicate with the space inside the filter cartridge; and a negative pressure actuator, which is installed in communication with the intake port of the filter cartridge.

According to this configuration, the ejector pump is directly mounted in the filter cartridge. At this time, the filter cartridge is used as a housing providing a vacuum chamber or an enclosed space. Thus, the vacuum system has a simple, compact configuration, so that it has a rapid vacuum response speed to compressed air and low vacuum loss compared to a known vacuum system.

Advantageous Effects

As described above, according to the present invention, the ejector pump is directly mounted in the filter cartridge. At this time, the filter cartridge is used as a housing providing a vacuum chamber or an enclosed space. Thus, the vacuum system has simple, compact configuration, so that it has a rapid vacuum response speed to compressed air and low vacuum loss compared to a known vacuum system.

DESCRIPTION OF DRAWINGS

FIG. 1 illustrates the configuration of a known vacuum system;

FIG. 2 illustrates the structure of a filter cartridge used in the vacuum system of FIG. 1;

FIG. 3 illustrates the configuration of a vacuum system according to an embodiment of the present invention;

FIG. 4 is a perspective view illustrating the filter cartridge of FIG. 3;

FIG. 5 is a top plan view of FIG. 3; and

FIG. 6 is a sectional view of FIG. 3.

DESCRIPTION OF REFERENCE NUMBERS OF MAIN PARTS IN DRAWINGS

| | |
|---|---|
| 10: vacuum system | 11: filter cartridge |
| 12: ejector pump | 13: adsorption pad |
| 14: intake port | 15: inflow port |
| 16: mounting port | 17: body |
| 19: inner wall | 23: filter |
| 24: cap | |

MODE FOR INVENTION

These and/or other aspects and advantages of the invention will become apparent and more readily appreciated from the following description of the embodiments, taken in conjunction with the accompanying drawings.

Referring to FIGS. 3 through 6, the vacuum system according to the present invention is indicated by reference numeral 10. The vacuum system 10 comprises a filter cartridge 11, an ejector pump 12 fastened to the filter cartridge 11, and a negative pressure actuator 13 installed in communication with an intake port 14 of the filter cartridge 11. Here, the ejector pump 12 is a known component. Thus, the ejector pump 12 will be described below only as needed for the operation of the vacuum system. Meanwhile, the negative pressure actuator 13 is a general name for an apparatus for treating a workpiece using a generated negative pressure, and includes an adsorption pad, a vacuum jig, a transfer cleaning suction port, or the like. However, the negative pressure actuator 13 is limited to the adsorption pad for the sake of convenience of description.

The filter cartridge 11 comprises a container-shaped body 17, which has the intake port 14, an inflow port 15 for compressed air, and a mounting port 16 in a sidewall thereof, and a concentric inner wall 19, which is integrally formed in the body 17. The inner wall 19 includes an inflow hole 21, which extends from the inflow port 15 to a nozzle 20 in an inward direction, and a mounting hole 22, which is formed so as to correspond to the mounting port 16.

The body 17 further includes a second inflow port 15a adjacent to the inflow port 15, and the inner wall 19 includes a second inflow hole 21a, which extends from the second inflow port 15a to a second nozzle 20a in an inward direction. The second inflow port 21a is not connected with the ejector pump 12. The inflow port 15 and the inflow hole 21 are provided to generate a vacuum in a space inside the filter cartridge 11. The second inflow port 15a and the second inflow hole 21a are provided to release the generated vacuum. Preferably, the second inflow hole 21a is oriented toward a filter 23 (see FIG. 6) in an upward direction.

As illustrated in FIG. 6, the filter 23 is disposed in the interior space defined by the inner wall 19, and, in detail, is fixedly cradled on the upper end of the inner wall 19. The body 17 includes a cap 24 to cover an upper opening thereof. At this time, the filter 23 and the cap 24 are spaced apart from each other. In order to secure the spaced distance and press and fix the cradled filter 23, a spacer 25 is interposed between the filter 23 and the cap 24. Preferably, the cap 24 is made of a transparent material to permit visual checking of the interior connections and operation, a state of the filter 23, and so on.

The ejector pump 12 comprises a nozzle body 26 having a series of nozzles 27a, 27b and 27c therein, and a through-hole 28 formed in the nozzle body 26 so as to enable communication with an enclosed space. The ejector pump 12 passes through the mounting port 16 of the filter cartridge 11 and the mounting hole 22, and one end thereof is installed so as to be adjacent to or inserted into the inflow hole 21. At this time, the through-hole 28 formed in the nozzle body 26 is disposed so as to communicate with the space inside the filter cartridge 11.

In FIG. 3, the adsorption pad 13 includes a fitting 29 for making a pipe connection with the intake port 14 of the filter cartridge 11, and a pad 30 fixed to the fitting 29. However, as long as negative pressure can be formed in a space inside the pad, the adsorption pad 13 can be used regardless of the shape thereof.

When the ejector pump 12 is mounted on the mounting port 16 of the filter cartridge 11, and when the adsorption pad 13 is installed on the intake port 14 so as to communicate with the intake port 14, the compressed air, which flows in and out through the inflow port 15 at a high speed, causes a vacuum to be generated in the space inside the filter cartridge 11 and negative pressure to be generated in the adsorption pad 13.

More specifically, the compressed air is supplied to the inflow port 15 of the filter cartridge 11, and is discharged to the outside via the ejector pump 12. At this time, the air inside the filter cartridge 11 is drawn into the through-hole 28, and is then discharged together with the compressed air, so that the vacuum is generated in the space inside the filter cartridge 11.

A vacuum gauge 31 (FIG. 3) measures the strength of the vacuum of the filter cartridge 11.

Simultaneously, the air in the adsorption pad 13 flows through the intake port 14, is guided by the inner wall 19, and is filtered while passing through the filter 23. Then, the filtered air is drawn into the through-hole 28, and is discharged together with the compressed air. In this process, the negative pressure is formed in the adsorption pad 13. This generated negative pressure allows the workpiece P (FIG. 3) to be held and transferred to a desired place.

When the transfer is completed, the compressed air is supplied to the second inflow port 15a of the filter cartridge 11, flows into the space inside the filter cartridge 11, and releases the vacuum formed in the space inside the filter cartridge 11. Further, the negative pressure generated at the same time is released. At this time, the compressed air is discharged into the upward second inflow hole 21a, and foreign materials deposited on the filter 23 are shaken off in a reverse direction. Thus, the lifespan of the filter 23 is increased. Meanwhile, the inflow port 15 and the second inflow port 15a can be selectively opened and closed by an electromagnetic valve (not shown).

The invention claimed is:

1. A vacuum system using a filter cartridge, comprising:
the filter cartridge, which includes: a container-shaped body having an interior space, which has an intake port, an inflow port for compressed air, and a mounting port in a sidewall thereof, and an upper opening of which is covered by a cap; a concentric inner wall, which includes an inflow hole extending from the inflow port to a nozzle in an inward direction, and a mounting hole formed so as to correspond to the mounting port; and a filter, which is fixedly cradled on an upper end of the inner wall, and filters air flowing in through the intake port;
an ejector pump, which passes through the mounting port of the filter cartridge and the mounting hole, is installed such that one end thereof is adjacent to or inserted into the inflow port, and includes a through-hole formed in a nozzle body so as to communicate with the interior space of the filter cartridge;
a negative pressure actuator, which is installed in communication with the intake port of the filter cartridge; and
wherein the body further includes a second inflow port for compressed air formed adjacent to the inflow port so as to release a vacuum generated in the interior space, and the inner wall includes a second inflow hole which extends from the second inflow port to a second nozzle in an inward direction and communicates directly with the interior space, the interior space not being connected with the ejector pump.

2. The vacuum system according to claim 1, wherein the filter is spaced apart from the cap.

3. The vacuum system according to claim 1, wherein the second inflow hole is oriented toward the filter in an upward direction, and when the compressed air supplied to the second inlet port is discharged into the upward second inflow hole, foreign materials deposited on the filter by the filtering of the air flowing in through the intake port are shaken off in a reverse direction by the compressed air.

* * * * *